United States Patent
Cotton

[11] Patent Number: 5,291,724
[45] Date of Patent: Mar. 8, 1994

[54] REEL ASSEMBLY FOR MOWER
[75] Inventor: Donald F. Cotton, Andalusia, Ala.
[73] Assignee: T.I. International, Inc., Andalusia, Ala.
[21] Appl. No.: 837,251
[22] Filed: Feb. 14, 1992
[51] Int. Cl.$^5$ .............................................. A01D 34/47
[52] U.S. Cl. .............................................. 56/251; 56/7; 56/294
[58] Field of Search .................. 56/251, 6, 7, 16.7, 56/249, DIG. 20, 294

[56] References Cited
U.S. PATENT DOCUMENTS

| | | |
|---|---|---|
| 623,121 | 4/1899 | Maynard . |
| 939,837 | 11/1909 | Hayden . |
| 966,800 | 8/1910 | Culver . |
| 1,192,970 | 8/1916 | Yank . |
| 1,441,073 | 1/1923 | English, Jr. . |
| 1,617,045 | 2/1927 | Darling . |
| 1,778,219 | 10/1930 | Kuhlman . |
| 1,847,683 | 3/1932 | Worthington . |
| 2,776,533 | 1/1957 | Yacoby . |
| 3,319,408 | 5/1967 | Landwehr . |
| 4,127,980 | 12/1978 | Ferguson .............................. 56/11.3 |
| 4,606,178 | 8/1986 | Saiia .................................... 56/7 X |
| 4,637,204 | 1/1987 | Benson et al. ........................ 56/7 X |
| 4,644,737 | 2/1987 | Arnold .................................. 56/249 |
| 4,653,256 | 3/1987 | Saiia .................................... 56/249 |
| 4,663,924 | 5/1987 | Saiia .................................... 56/249 |

FOREIGN PATENT DOCUMENTS 122235 9/1946 Australia .
2607389 8/1977 Fed. Rep. of Germany .

*Primary Examiner*—Terry Lee Melius
*Attorney, Agent, or Firm*—Hill, Steadman & Simpson

[57] ABSTRACT

A mechanism for use in a reel type lawn mower for maintaining a constant uniform pressure between V-shaped reel blades and a bedknife. The blades are arranged to maintain continuous contact with the bedknife on both sides of the center of the reel. A biasing unit acts between the reel unit and the bedknife unit to apply a regulated pressure on both sides of the reel center.

11 Claims, 2 Drawing Sheets

REEL ASSEMBLY FOR MOWER

BACKGROUND OF THE INVENTION

This invention relates to an improved reel type lawn mower and, in particular, to a reel type mower wherein uniform constant pressure is maintained between the blades of the reel and the bedknife of the machine.

In most convention reel type lawn mowers, the relative position of the bedknife or the reel can be adjusted or leveled to bring the blades of the reel and the bedknife into proper alignment across the transverse width of the assembly. The adjusting mechanism usually provides for a positive fixed setting of the reel in relation to the bedknife. Once the desired setting is attained, the mechanism is locked in place in an effort to maintain the desired setting and thus avoid chatter, uneven wear and binding of the reel blades with the bedknife.

As is well known in the art, the reel blades become worn with usage thereby requiring constant resetting of the adjusting mechanism. In cases where the mower is subjected to excessive use, as for example, on golf courses, the adjusting mechanism oftentimes must be reset on a daily basis. As the blade wear becomes more pronounced, adjustment becomes more difficult because the helical reel blades typically do not wear uniformly over the length of the blade. To counter this nonuniform wear, the bedknife sometimes is twisted in the machine frame by applying varying forces at either end of the bedknife. The amount of twisting that can be accomplished, however, is rather limited and blade binding becomes a problem. Frequent back lapping of the blades is also required to keep the blades in condition for efficient mowing.

OBJECTS AND SUMMARY OF THE INVENTION

It is therefore a primary object of the present invention to improve reel type lawn mowers.

It is a further object of the present invention to automatically maintain a desired alignment between the reel and the bedknife of a lawn mower.

A still further object of the present invention is to maintain a constant and uniform pressure between the blades and the bedknife of a reel type lawn mower.

Another object of the present invention is to reduce the amount of time and effort required to maintain a reel type mower in proper adjustment.

Yet another object of the instant invention is to prevent the blades of a reel type mower from binding against the bedknife of the mower.

These and other objects of the present invention are attained in a reel type mower having a reel unit and a bedknife unit mounted adjacent to each other in the mower frame. The reel includes a series of V-shaped blades positioned about its periphery with the crown of the blades being located at the center of the reel and the two trailing edges of the blades being twisted rearwardly in the direction of reel rotation. The blades are arranged to move in contact with the bedknife as the reel turns so that at least one point of contact is maintained at all times on either side of the reel center. A biasing mechanism acts between the reel unit and the bedknife unit to maintain a constant contact pressure between the reel blades and the bedknife. The biasing pressure may be derived from a spring mechanism, a hydraulic mechanism, or the like.

BRIEF DESCRIPTION OF THE DRAWINGS

For a better understanding of these and other objects of the present invention, reference shall be made to the following detailed description of the invention which is to be read in association with the accompanying drawings, wherein.

DETAILED DESCRIPTION OF A PREFERRED EMBODIMENT

Figure 1:
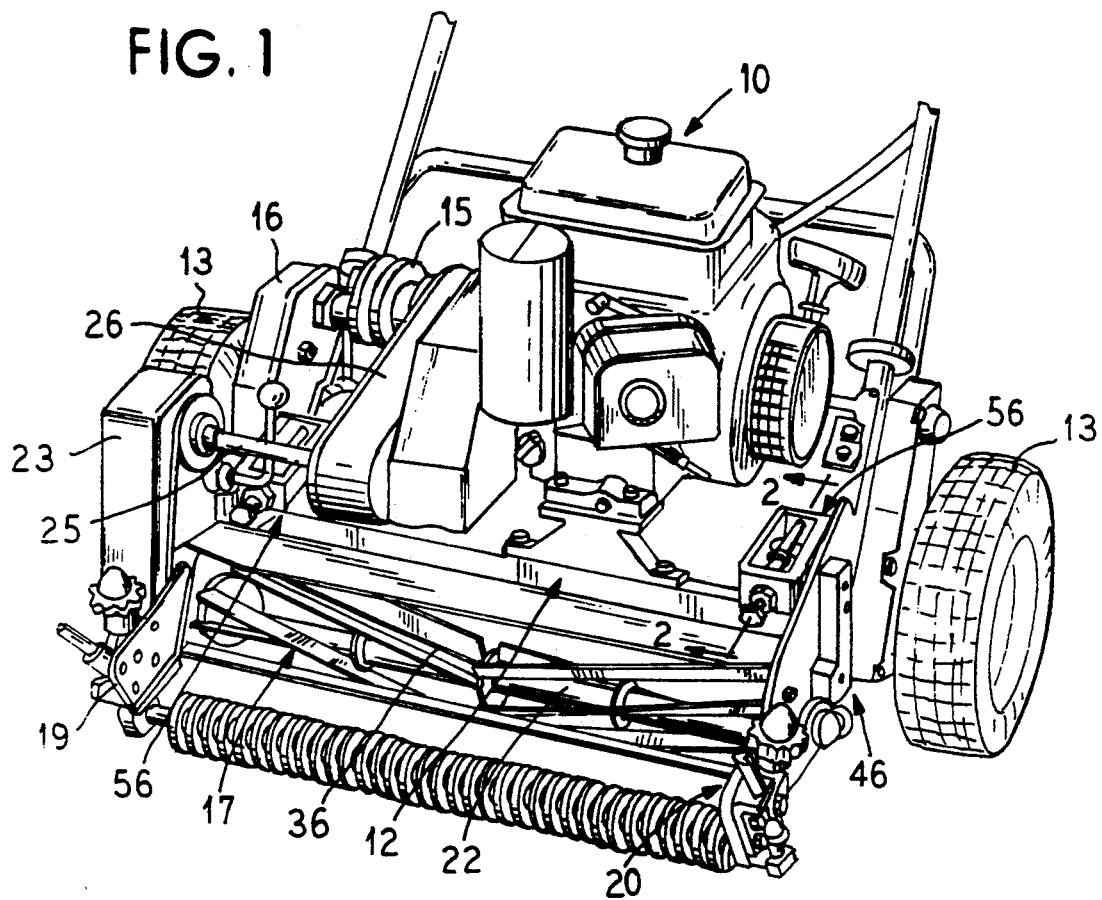
FIG. 1 is a perspective view of a self propelled driven lawn mower embodying the teachings of the present invention.

Referring now to the drawings, and in particular to FIG. 1, there is illustrated a self-propelled lawn mower 10 of conventional design. The mower includes a gasoline powered engine 11 mounted upon a frame 12. A pair of wheels 13—13 are mounted for rotation in the frame and are coupled to the motor drive shaft 15 through means of a power transmission 16. A reel unit, generally referenced 17, is rotatably suspended between two side plates 19 and 20 that are secured to the machine frame by any suitable means such as mounting bolts.

The reel unit contains an axially disposed shaft 22 that is supported within suitable bearing blocks carried by the side plates. The left hand end of the reel shaft as viewed in FIG. 1 passes through side plate 19 and is passed into the housing 23. Although not shown, the extended end of the reel shaft is coupled to a power take-off shaft 25 by means of a timing belt. The power take-off shaft is in turn connected to the motor drive shaft 15 by a second timing belt (not shown) housed within casing 26. A roller unit 27 is suspended between the side plates at the front of the mower which rides in contact with the ground forward of the reel unit. As is well known in the art, the height of the roller unit may be adjusted to regulate the cutting height of the mower.

Figure 2:
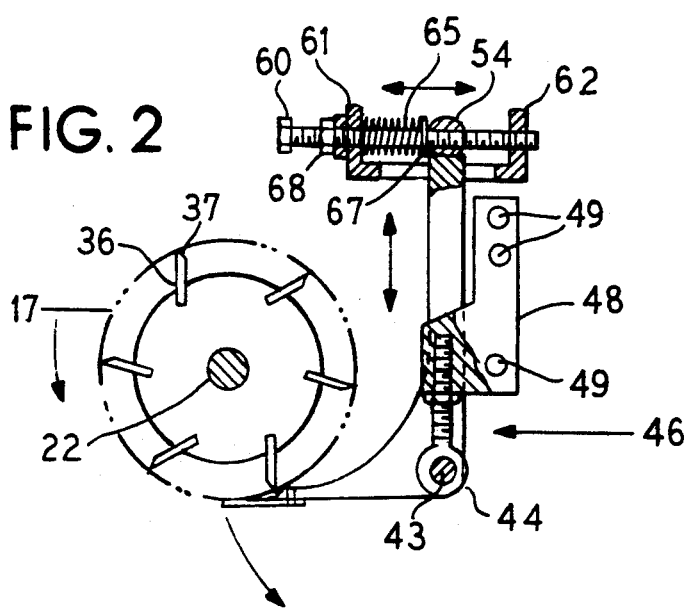
FIG. 2 is a partial side elevation in section showing the reel and bedknife mounting arrangement used in the mower of FIG. 1.
Figure 3:
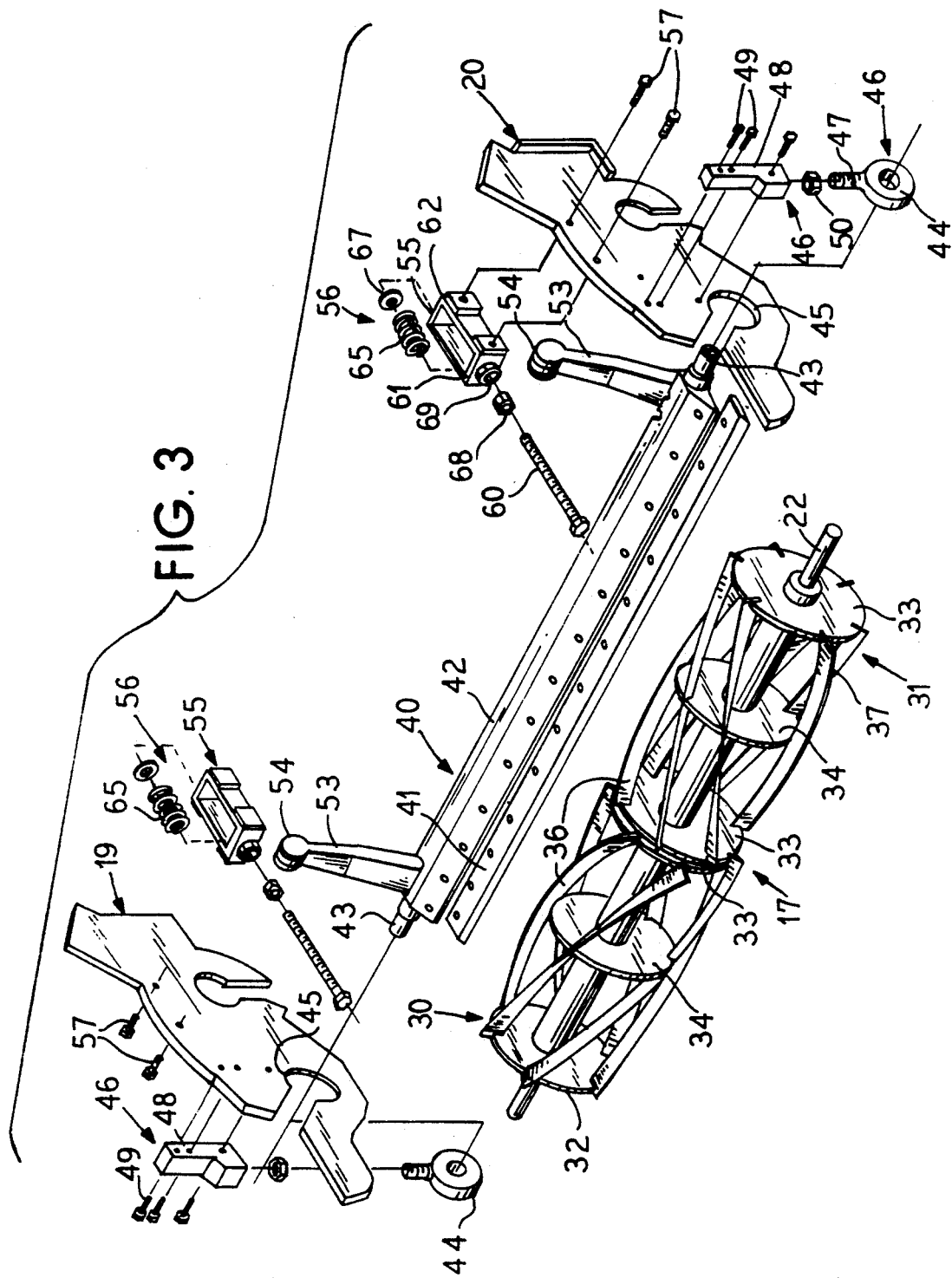
FIG. 3 is an exploded view in perspective showing the reel and bedknife mounting and adjusting components.

As further illustrated in FIGS. 2 and 3, the reel unit 17 includes two axially aligned half sections 30 and 31 which are of similar construction and of equal axial length. Each section contains a pair of opposed radially disposed end discs 32 and 33 and a central disc 34 positioned mid-way therebetween. All discs are of the same diameter and are welded to the reel shaft 22 (for rotation therewith). A series of cutting blades 36—36 are secured to the outer periphery of the discs in each half section. Each blade is helical in form and is twisted along its length. Preferably, each blade is twisted about 45° in ten inches of blade length.

The reel blades are mounted in pairs with one blade in each pair being mounted in one of the adjacent half sections. Each blade pair is generally V-shaped and describes what is herein referred to as a "staggered chevron". The inner tips of the blades in a pair which form the point of the chevron do not meet at the axial center of the reel, but rather the tip of one blade is superimposed over the tip of the other. The amount of overlap between tips is shown exaggerated in the drawing for the purpose of clarity. Each blade is twisted rearwardly in the direction of reel rotation so that the point of the chevron contacts the bedknife initially and the blade action is from the center of the chevron outwardly toward its outer tips. Each blade is sharpened in a conventional manner to provide a cutting edge 37 that moves across the bedknife as the reel rotates. Although a staggered chevron blade configuration is herein illustrated, a true chevron configuration may also be employed without departing from the teachings of the present invention.

A bedknife unit, generally referenced 40, is also pivotally suspended between the two side plates 19 and 20. The bedknife 41 is of conventional design and is attached to an elongated support bar 42 by means of screws. Each end of the bar is equipped with trunnions 43—43. The trunnions pass through openings 45—45 in the side plates and are supported for rotation in adjustable bearings units 46—46. Each bearing unit includes a bushing 44 that is press fitted onto one of the trunnions and a threaded shank 47 that is screwed into a support block 48. The support block in turn is securely mounted on the outside of the adjacent side plate by means of screws 49—49.

A lock nut 50 is threaded into the shank 47 of each bearing unit which, in assembly, is locked against the bottom wall of the support block to hold the bushing and thus the bedknife at a desired location in regard to the reel unit.

A pair of rocker arms 53—53 extend upwardly from the opposite ends of the bedknife support bar 42. A bifurcated member 54 is located at the distal end of each rocker arm. The bifurcated members, in assembly, are movably mounted inside rectangular shaped brackets 55—55 of adjusting units 56—56. The brackets are secured to the inside walls of side plates 29 and 20 via screws 57—57.

As best illustrated in FIG. 2, a bolt 60 is threaded into the opposing end walls 61 and 62 of each bracket 55. The shank of the bolt is arranged to pass through the two raised arms of the bifurcated member 54 situated in the housing. A compression spring 65 encircles the bolt shank and is adopted to act between the end wall 61 of the bracket and the bifurcated member. A washer 67 is mounted between the spring and the bifurcated member. As can be seen, by turning the bolt within the bracket, the biasing force of the spring exerted upon the rocker arm, and thus the bedknife, can be accurately adjusted. A locknut 68 is also threaded on the bolt shank which acts against a raised pad 69 on the bracket to lock the bolt in a desired position.

The bedknife is brought into contact with the blades of the reel using the adjustable bearing units 46—46. When the proper adjustment has been attained, the bearing units are locked in place. This chevrons are arranged so that the trailing edges of the blades on either side of the chevron points are in contact with the bedknife at all times as the chevron rotates in the direction indicated in FIG. 2. By slightly staggering the chevrons on the reel, at least one blade in the next downstream chevron pair will move into contact with the bedknife before the trailing edge of the upstream chevron has cleared the bedknife, thus assuring that there is no interruption in blade contact as one chevron moves off the bedknife and the next chevron moves onto the bedknife.

With the bedknife properly aligned with the reel blades, the biasing tension applied by the bedknife is adjusted by using the bolts 60—60 of the adjusting units 56—56. Using the bolts, the biasing pressure applied by the springs 65—65 is adjusted so that the chevrons are supported on each side of center with a uniform or equal pressure whereby chattering, uneven blade wear and binding is avoided. Tests conducted on the present apparatus show that the mower will stay in proper adjustment for extremely long periods of operation. Because the blades of the reel cannot dig or bind against the bedknife the blades also remain in a sharp condition far longer than the blades of a conventional machine.

While this invention has been explained with reference to the structure disclosed herein, it is not confined to the details set forth and this application is intended to cover any modifications and changes as may come within the scope of the following claims.

What is claimed is:

1. Apparatus for automatically maintaining the reel of a lawn mower in adjustment with the bedknife of the mower that includes
    a frame,
    a bedknife unit for supporting a bedknife in said frame,
    a reel unit rotatably mounted in the frame adjacent to the bedknife,
    said reel unit being divided into two adjacent, axially-aligned half-sections,
    each half-section further including a series of spaced-apart, radially disposed discs and a plurality of helically-shaped blades mounted upon the outer periphery of said discs, said blades extending transversely across each half-section from the center of the reel to the outer edge thereof,
    said helical blades being mounted in pairs on the adjacent half-sections with the inner edge of each pair being juxtaposed at the center of the reel, said blades being twisted in the direction of rotation of the reel so that at least one blade on each half-section is capable of contacting the bedknife at any given time, and
    biasing means for automatically maintaining a constant, uniform contact pressure between the blades and the bedknife as the blades move over the bedknife.

2. The apparatus of claim 1 wherein the inner tips of the blades in each pair form a Chevron.

3. The apparatus of claim 1 wherein the inner tips of the blades in each Chevron pair are staggered one above the other.

4. The apparatus of claim 2 wherein said bedknife unit further includes trunnion means for rotatably supporting the bedknife whereby the bedknife is movable into contact with the blades of the reel and said biasing means acts against said bedknife unit to hold the bedknife against said blades with a uniform pressure.

5. The apparatus of claim 4 wherein said bedknife unit further includes a pair of rocker arms and an adjustable spring means acting against the rocker arms to apply a predetermined biasing pressure against the reel blades.

6. The apparatus of claim 5 wherein said spring means further includes a pair of brackets mounted in the frame or adjacent the outside edges of the reel, a spring mounted inside each bracket which is compressed between the bracket and a rocker arm or the bedknife unit, and adjusting means to regulate the spring force acting between the bracket and the rocker arm.

7. The apparatus of claim 6 that further includes a bushing means mounted in the frame for rotatably supporting the trunnion means of said bedknife unit and aligning means for adjusting the position of the bedknife unit to said frame.

8. The apparatus of claim 1 wherein each half section includes a series of spaced apart discs mounted for rotation upon a common shaft and said blades helically supported upon said disc.

9. The apparatus of claim 8 wherein said blades are twisted approximately 45° in ten inches of blade length.

10. Apparatus for automatically maintaining the reel of a lawn mower in adjustment with the bedknife of the said apparatus including, a frame having two spaced apart side plates extending outwardly from said frame, a reel unit mounted for rotation between the said plates, said reel unit further including a plurality of chevron shaped blades mounted thereon with the point of the chevron being located at the center of the reel and the blades of the chevron being twisted in the direction of rotation of the reel, a bedknife unit pivotally mounted in said side plates adjacent to the reel unit having a bedknife that is arranged to contact each chevron blade on either side of the chevron point as the blade moves thereover, an adjustable biasing means acting upon the bedknife unit for maintaining a constant uniform pressure between the bedknife and the chevron blade, wherein said bedknife further includes a pair of raised rocker arms being positioned on either side of the reel center and said biasing means further includes a spring means action on each of the rocker arms.

11. The apparatus of claim 10 that further includes positioning means for locating the bedknife unit adjacent to the reel unit.

* * * * *